US012729123B2

(12) United States Patent
Ros Lis et al.

(10) Patent No.: US 12,729,123 B2
(45) Date of Patent: Sep. 8, 2026

(54) METHOD FOR OBTAINING BIMODAL MESOPOROUS MATERIALS BASED ON SILICON OXIDES USING MICROWAVE RADIATION

(71) Applicant: Universitat de València, Valencia (ES)

(72) Inventors: José Vicente Ros Lis, Valencia (ES); Ana María Costero Nieto, Valencia (ES); Pedro Amorós Del Toro, Valencia (ES); Jamal El Haskouri Bennagi, Valencia (ES); Borja Díaz De Greñu Puertas, Valencia (ES); Sara Muñoz Pina, Valencia (ES); Ruth De Los Reyes Cánovas, Valencia (ES)

(73) Assignee: Universitat de València, València (ES)

( * ) Notice: Subject to any disclaimer, the term of this patent is extended or adjusted under 35 U.S.C. 154(b) by 484 days.

(21) Appl. No.: 18/202,723

(22) Filed: May 26, 2023

(65) Prior Publication Data

US 2023/0294997 A1 Sep. 21, 2023

Related U.S. Application Data

(63) Continuation of application No. PCT/ES2021/070846, filed on Nov. 24, 2021.

(30) Foreign Application Priority Data

Nov. 27, 2020 (ES) ............................... ES202031193

(51) Int. Cl.

*C01B 33/113* (2006.01)
*B01J 6/00* (2006.01)

(52) U.S. Cl.

CPC ............. *C01B 33/113* (2013.01); *B01J 6/001* (2013.01); *C01P 2004/53* (2013.01); *C01P 2004/64* (2013.01)

(58) Field of Classification Search

CPC ............................... C01B 33/113; B01J 6/001

See application file for complete search history.

(56) References Cited

FOREIGN PATENT DOCUMENTS

WO 01/72635 A1 10/2001

OTHER PUBLICATIONS

Feng, Functionalized Monolayers on OrderedMesoporous Supports, Science, vol. 276, Issue 5314, 923-926 (Year: 1997).*

Samran, B; White, T. J. White; Wongkasemjit, S./ A novel room temperature synthesis of mesoporous SBA-15 from silatrane; Journal of Porous Materials, vol. 18, No. 2, pp. 167-175, Apr. 2011.

(Continued)

*Primary Examiner* — James A Fiorito

(74) *Attorney, Agent, or Firm* — Boyle Fredrickson, S.C.

(57) ABSTRACT

A method for obtaining bimodal mesoporous materials based on silicon oxides by using microwave radiation. A method for obtaining bimodal mesoporous materials, based on silicon oxides, from atranic precursors, characterized in that it comprises: —a first step of forming a mesostructured material containing organic matter, —and a second step of eliminating the organic matter contained in the mesostructured material, by calcination, obtaining a bimodal mesoporous material based on silicon oxide, such that at least one of the two steps is carried out by irradiation of the corresponding starting material, with microwave radiation from solid state sources.

13 Claims, 5 Drawing Sheets

(56) References Cited

OTHER PUBLICATIONS

Roddy Colina, Juan Primera, Fredy Ysambertt, Eric Plaza, Lenin Huerta; Evaluation of microwave extraction of organic matter present in crushed gels synthesized by atrane way; Rev. Tech. Eng. University, Zulia. vol. 36, Nº 1, 38-44, 2013.
Natalia Candu, Simona Coman, Vasile I, Parvulescu, Jamal El Haskouri, Pedro Amoros, Daniel Beltran; Metal Triflates Incorporated in Mesoporous Catalysts for Green Synthesis of Fine Chemicals; Top Catal. (2009) 52:571-578.
Jeong, SM (Jeong, Sung-Min); Burri, A (Burri, Abhishek); Jiang, NZ (Jiang, Nanzhe); Park, SE (Park, Sang-Eon); Microwave synthesis of hydrophobic Ti-TUD-1 mesoporous silica for catalytic oxidation of cycloolefins; Applied Catalysis A-General, vol. 476, pp. 39-44, 2014.
Thesis of José Manuel Morales Tatay, entitled "modulation of the mesostructure and composition in nanoparticulate silica with hierarchical porosity" (Universitat de Valencia, 2014).
Solid State Sciences vol. 2, Issue 4, Jun. 4, 2000, pp. 405-420, "Generalized syntheses of ordered mesoporous oxides: the atrane route", Jamal El Haskouri, Carmen Guillen, Julio Latorre, Aurelio Beltrán-Porter, Daniel Beltrán-Porter, M. Dolores Marcos, Pedro Amorós.
Bharat L. Newalkar et al.; "Rapid synthesis of mesoporous SBA-15 molecular sieve by a microwave-hydrothermal process"; The Royal Society of Chemistry 2000; Irvine, CA, USA dated Aug. 30, 2000—(2) pages.
Leonard Alberto Molero Barboza et al.; "Synthesis and characterization of mesoporous solids type A1-UVM-7 with bimodal pore system"; Universidad del Zulia vol. 19 N 4, Oct.-Dec. 2011; Ciencia 19(4), 293-301, 2011, Maracaibo, Venezuela—(9) pages.
International Search Report mailing date Jan. 25, 2022; Application No. PCT/ES2021/070846—(2) pages.
El Haskouri, J., et al., Nanoparticulated Silicas with Bimodal Porosity: Chemical Control of the Pore Sizes, Inorganic Chemistry, Sep. 15, 2008, vol. 47, N 18, pp. 8267-8277, ISSN 0020-1669, DOI: 10.1021/ic800893a; abstract, paragraph: "Experimental Section"—(12) pages.
Yu, J., et al., Effects of microwave drying on the microstructure and photocatalytic of bimodal mesoporous TiO2 powders, Journal of Physics and Chemistry of Solids, Jan. 4, 2010, vol. 71, N 4, p. 523-526, ISSN 0022-3697; abstract, paragraph: "Experimental"—(3) pages.
Diaz De Grenu, B., et al., Recent Progress of Microwave-Assisted Synthesis of Silica Materials, Nanomaterials, Jan. 6, 2020, vol. 10, N 6, p. 1092, DOI: 10.3390/nano 10061092; abstract, paragraph: "Microwave-Assisted Synthesis of Silica Mesoporous Materials"—(21) pages.
Diaz De Grenu, B., et al., Micowave-Assisted Synthesis of Covalent Organic Frameworks: A Review, Chemsuschem, Epub Sep. 25, 2020, vol. 14, N 1, pp. 208-233, ISSN 1864-5631 (print) ISSN 1864-564X (electronic), DOI: 10.1002/cssc.202001865; abstract—(77) pages.
Haskouri, J.E., et al., ZnO nanoparticles embedded in UVM-7-like mesoporous silica materials: Synthesis and characterization, Physica E: Low-dimensional Systems And Nonostructures, Jan. 11, 2009, vol. 42, N 1, pp. 25-31, ISSN 1386-9477, DOI: 10.1016/j.physe.2009.08.011; abstract—(3) pages.

* cited by examiner

METHOD FOR OBTAINING BIMODAL MESOPOROUS MATERIALS BASED ON SILICON OXIDES USING MICROWAVE RADIATION

CROSS-REFERENCE TO RELATED APPLICATIONS

This application claims priority to and is a continuation of PCT Application No. PCT/ES2021/070846, filed Nov. 24, 2021, which, in turn, claims priority to Spanish Application No P202031193, filed Nov. 27, 2020, the entire contents of each application is incorporated herein by reference.

FIELD OF THE INVENTION

The present invention refers to a process for the preparation of bimodal mesoporous materials based on silicon oxides, obtained by means of application of microwave energy coming from solid state sources,

BACKGROUND OF THE INVENTION

Mesoporous materials (MCM-41, SBA-15, UVM-7) are widely used by different sectors due to the excellent properties related to high surface areas and modulable particle size. However, they have the disadvantage that their synthesis is slow and tedious, which usually implies long processing and/or aging times. Also, in many cases it is not scalable to a larger amount. Additionally, and imperatively, after obtaining them, they require a calcination stage lasting several hours, necessary to eliminate the surfactant that has been used in the synthesis as a directing agent in the formation of pores. All this limits the profitability and commercial applicability of these materials to the areas in which they are used on a small scale. There is, therefore, a need to address these drawbacks to obtain materials based on mesoporous silicon oxides through preparative strategies that are faster and easier than current procedures, and that also allow a greater amount of final material (already calcined) to be obtained) in less time. This could lead to a larger-scale production, such as a pilot plant or even an industrial one, of this type of material.

Until now, the methodologies to eliminate the directing agent used to obtain solids (mesoporous) require acids, organic solvents or calcination in ovens based on electrical resistance. However, up to now there has not been a method capable of completely calcining the solid in a simple way and in a short time.

The article by Samran, B; White, T. J. White; Wongkasemjit, S./*A novel room temperature synthesis of mesoporous SBA-15from silatrane*; Journal of Porous Materials, Volume: 18, Number: 2, Pages: 167-175, April 2011, discloses the synthesis of ordered two-dimensional mesoporous silicas by the atrane method and, as a comparison, they are also prepared by the microwave-assisted hydrothermal pathway. SBA-15 is not a bimodal material. Also, the microwave source is a magnetron. The synthesis time with microwave energy reported in this article is still on the order of hours.

The article by Roddy Colina, Juan Primera, Fredy Ysambertt, Eric Plaza, Lenin Huerta; *Evaluation of microwave extraction of organic matter present in crushed gels synthesized by atrane way*; Rev. Tech. Eng. University, Zulia. Vol. 36, N° 1, 38-44, 2013 studies the microwave extraction of organic matter present in gels with a Triethanolamine/Si ratio of 1, synthesized by the atrane pathway. However, a solid state microwave source is not used, nor are bimodal oxides of silicon obtained.

The article by Natalia Candu, Simona Coman, Vasile I, Parvulescu, Jamal El Haskouri, Pedro Amoros, Daniel Beltran; *Metal Triflates Incorporated in Mesoporous Catalysts for Green Synthesis of Fine Chemicals*; Top Catal. (2009) 52:571-578, discloses the synthesis of unimodal and bimodal silicon oxides by the atrane method and, on the other hand, discloses the use of microwaves, however not for the synthesis of mesoporous solids, but for acylation reactions in which mesoporous solids are used.

The article by Jeong, SM (Jeong, Sung-Min); Burri, A (Burri, Abhishek); Jiang, NZ (Jiang, Nanzhe); Park, SE (Park, Sang-Eon); *Microwave synthesis of hydrophobic Ti-TUD-*1 *mesoporous silica for catalytic oxidation of cycloolefins*; Applied Catalysis A-General, Volume: 476, Pages: 39-44, 2014, discloses the synthesis of ordered bimodal silicon oxides (with various amounts of Ti and with triethanolamine as structure directing agent and as chelating agent) using microwave radiation. However, it is distinguished from the present invention in that the microwave source is a magnetron and not a solid state source. In addition, they do not use microwaves in the synthesis or in the calcination, but rather for the aging of the mixed material of titanium oxide and silicon, so the reaction time with microwaves is at least 2 hours. WO0172635 A1 describes examples of a process similar to that of the present invention to synthesize, for example, UVM-7, with the difference that microwave energy is not used. A mesoporous silicon oxide with a bimodal pore system is synthesized (Example 1: Silicon oxide with a bimodal pore system: UVM-7).

There is no known method that allows the complete synthesis (obtaining and calcination) of materials based on mesoporous silicon oxide using microwave radiation from solid state sources.

BRIEF DESCRIPTION OF THE INVENTION

The solid state sources for microwave radiation used according to the embodiments of the present invention achieve a reduction in time, energy savings and greater reproducibility than the processes currently used to carry it out. The main difference with respect to the conventional method of preparation of this type of solids is based on the application of microwave energy from solid state sources. Starting with the application of this technology under well-controlled conditions, products are obtained quickly and homogeneously. For the exact control of the applied conditions, it is necessary to use a solid-state microwave source, as opposed to the magnetrons used by conventional chemical synthesis equipment. A magnetron requires a transformer that converts the 220V alternating current into 4000V direct current, it does not allow precise control of the power for the synthesis of the materials of interest, and further, the magnetrons have a shorter life time. A magnetron works discontinuously, under on-off (ON-OFF) cycles, while solid-state microwave sources allow specific selection of irradiation time and power, and these parameters are constant and stable over the process time.

The present invention achieves the shortening of the reaction times described in the state of the art, compared with the use of conventional techniques (synthesis on a hot plate with stirring and calcination in a muffle), and even with the energy of microwave radiation from a magnetron.

The invention improves the times necessary to achieve the preparation of bimodal mesoporous materials based on silicon oxides, considering the obtaining of the solid and the elimination of the surfactant, used as directing agent for the formation of pores, by means of calcination.

Another advantage is the homogeneity of the material that is obtained by the process of the present invention, which is the result of the repeatability that is achieved with solid-state microwave radiation sources, which manage to form very homogeneous solids under well-defined conditions. This is so due to the detailed control of parameters that these radiation sources make possible.

With the ultra-fast process of the invention, shorter crystallization times and faster supersaturation of the solution are achieved, factors that also contribute to the greater homogeneity of the products obtained.

Another advantage is energy savings. The energy consumption of a microwave with a solid state source is lower than that of a microwave with a magnetron source, and much less than that of a traditional hot plate or that of the muffles conventionally used in the calcination stage.

Another advantage is that microwaves have a much lower cost than muffles, as well as being less bulky, so if this technique is generalized, economic resources (purchase of equipment) and materials (space) will be optimized.

BRIEF DESCRIPTION OF THE FIGURES

FIG. 3. Special calcination chamber used in examples 2 and 3, wherein:

1: Porcelain crucible

2: Microwave Susceptor Crucible

3: refractory insulator

Figure 4:
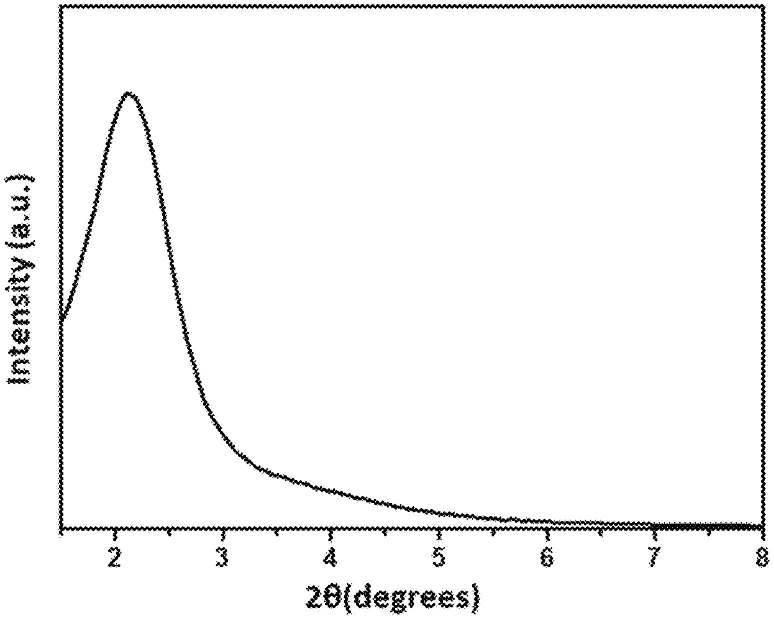

FIG. 4. X-ray diffraction spectrum (CuKα radiation) of calcined UVM-7 mesoporous silicon oxide prepared according to the specific process corresponding to example 2.

Figure 5:
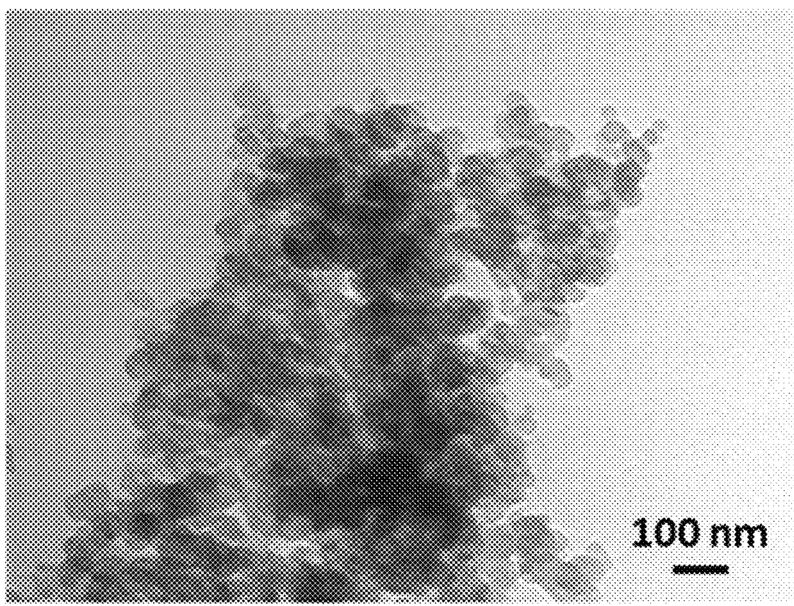

FIG. 5. TEM image of the product of example 2.

Figure 6:
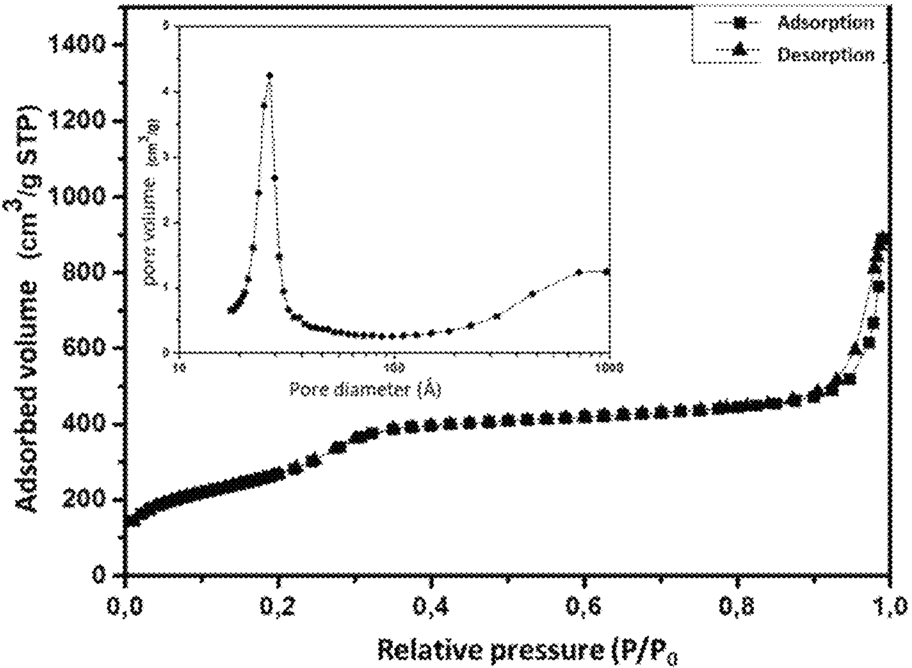

FIG. 6. Nitrogen adsorption-desorption isotherms (black squares and triangles, respectively) and pore distribution (white circles) of the product of example 2.

Figure 7:
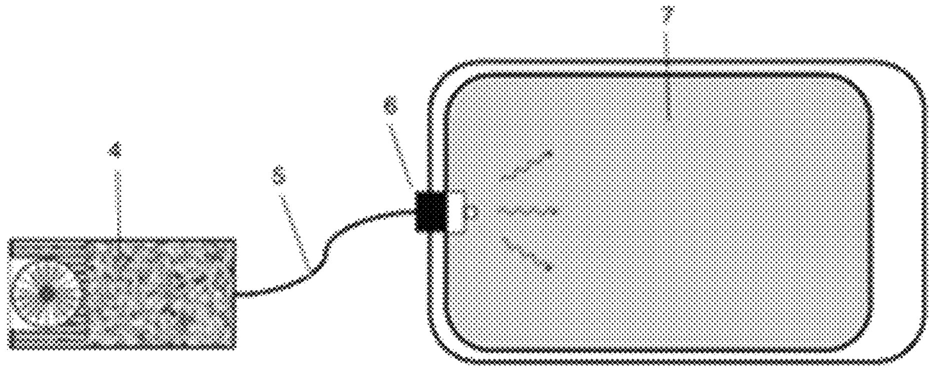

FIG. 7. Diagram of the experimental equipment used in examples 1-3, wherein:

4: microwave source

5: Coaxial cable 6: Antenna

7: Microwave Cavity

Figure 8:
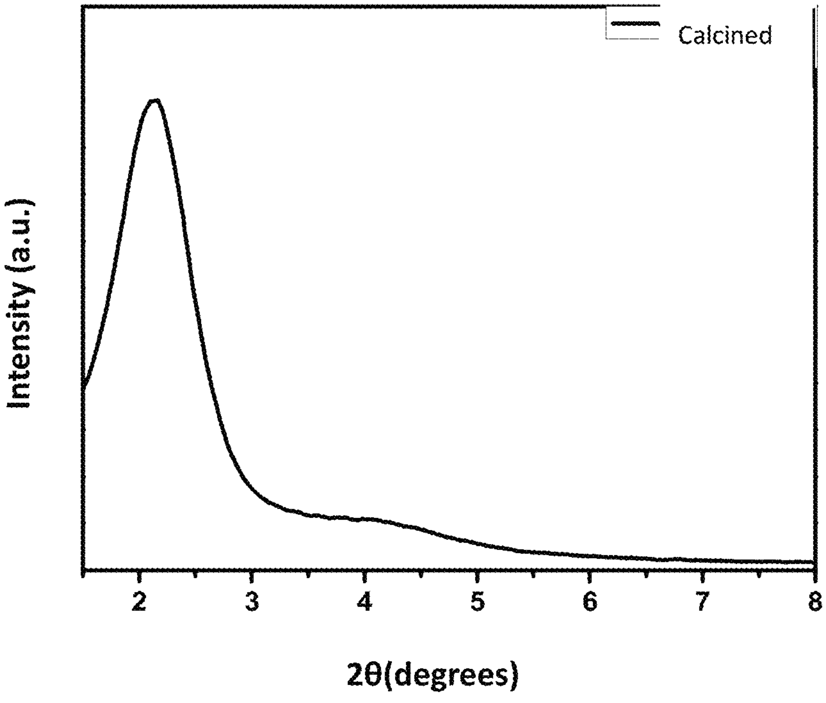

FIG. 8. X-ray diffraction spectrum (CuKα radiation) of UVM-7 "as made" mesoporous silicon oxide, calcined and functionalized, prepared according to the specific process corresponding to example 3.

Figure 9:
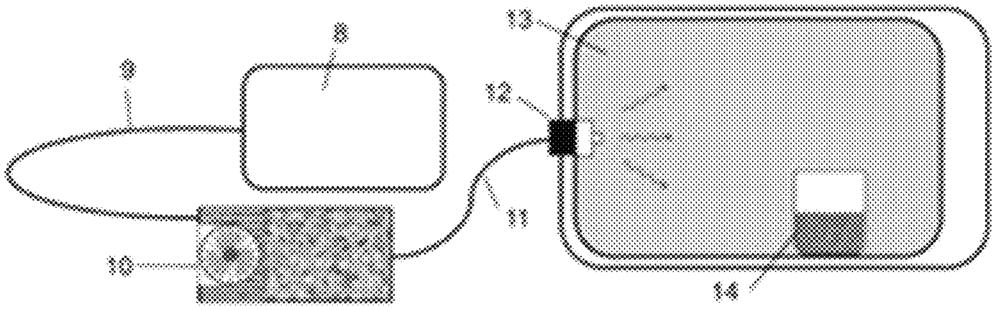

FIG. 9. Diagram of the experimental equipment wherein:

8: Control unit 9: USB cable

10: Solid State Microwave Source

11: Coaxial Cable

12: Antenna

13: Microwave cavity

14: Reaction vessel

DETAILED DESCRIPTION OF THE PRESENT INVENTION

The present invention provides an ultra-fast process for obtaining bimodal mesoporous materials, based on silicon oxides by using microwave radiation from solid state sources.

As used herein "bimodal" means having two types of pores:

mesopores of two different sizes or mesopores and macropores.

As used herein "bimodal" and "with dual pore system" have the same meaning.

Mesoporous material means that the pore diameter size is 2 to 50 nm, preferably 2 to 20 nm and more preferably 2 to 10 nm. If the pore is not circular, the size refers to the width of the pore, which will be between 2 and 50 nm, preferably between 2 and 20 nm and more preferably between 2 and 10 nm.

The present invention refers to a process for obtaining bimodal mesoporous materials, based on silicon oxides, starting from atrane precursors, characterized in that it comprises:

a first step of formation of a mesostructured material which contains organic matter, and a second stage of elimination of the organic matter contained in the mesostructured material, by calcination, obtaining a bimodal mesoporous material, based on silicon oxide, and such that at least one of the two steps is carried out by irradiation of the corresponding starting material, with microwave radiation coming from solid-state sources.

The term "mesostructured" means that the pores are regularly organized with distances among them in the meso range, that is, with pore diameters or widths between 2 nm and 100 nm. The mesostructured material comprises both types of pores, that is, it is bimodal.

The atrane does not "react" with the structure directing agent, such as CTABr, but rather forms the material around the structure directing agent, and this is the reason why it is named this way.

According to particular embodiments, the first step comprises contacting the atrane with water in the presence of an alkyltrimethylammonium salt wherein the alkyl group is an alkyl group of between 8 and 18 carbon atoms, and subjecting the mixture to microwave radiation coming from solid state sources.

The "atranes" or "atrane complexes" are obtained by reacting a metal precursor, such as a salt, an oxide or, most commonly, an alkoxide, of a metal (for example, silicon) with a trialkylamine, such as the triethanolamine. Triethanolamine, in the case of metal alkoxides, fully or partially replaces the alkoxo groups, acting as a chelating ligand.

According to particular embodiments, the atranes have one or several molecules of triethanolamine with the OH groups forming a complex with the metal, and in the case of those metals that can accept greater electron density (as is the case of silicon), the non-bonding pair of electrons of the nitrogen of the triethanolamine can provide that electron density.

According to the process of the invention, the atrane complex is reacted with water in the presence of a structure directing agent, which is an alkyltrimethylammonium salt in which the alkyl group is a long chain alkyl group, such as between 8 and 18 carbon atoms, thus obtaining a mesostructured material.

"Formation of the mesostructured material" means heating the starting atrane compound with water in the presence of a structure directing agent.

Atranes are known compounds, which in the case of silicon are typically formed by reaction of an alkoxysilane, such as TEOS, and triethanolamine. The synthesis of atranes is described in the state of the art, for example, in the articles mentioned above:

Journal of Porous Materials, Volume: 18, Number: 2, Pages: 167-175, April 2011,

Rev. Tech, Eng. University, Zulia. Vol. 36, No. 1, 38-44, 2013,

Top Catal. (2009) 52:571-578, or in the thesis of Josê Manuel Morales Tatay, entitled "modulation of the mesostructure and composition in nanoparticulate silica with hierarchical porosity" (Universitat de València, 2014).

The use of atranes for this application was first published in Solid State Sciences Volume 2, Issue 4, 4 Jun. 2000, Pages 405-420, "Generalized syntheses of ordered mesoporous oxides: the atrane route", Jamal El Haskouri, Carmen Guillen, Julio Latorre, Aurelio Belträn-Porter, Daniel Beltrân-Porter, M. Dolores Marcos, Pedro Amorös.

The organic matter contained inside the mesostructured material obtained in the first stage of the procedure is a quaternary alkyltrimethylammonium cation with a long-chain alkyl group, such as between 8 and 18 carbon atoms.

According to particular embodiments, the present invention refers to a process for obtaining bimodal mesoporous materials, based on silicon oxides, starting from atrane precursors. as defined above, and wherein the two steps, first and second, are carried out by irradiating the corresponding starting material with microwave radiation from solid state sources.

According to particular embodiments, the mesostructured material obtained in the first stage is formed by a porous solid with the formula $SiO_2$ with an alkyltrimethylammonium inside the pores.

According to additional particular embodiments, the materials obtained by the process are made up of welded nanometric porous particle aggregates which generate a bimodal pore system: mesopores generated by the removal of a structure directing agent and macropores located between the porous nanoparticles.

The bimodal mesoporous materials, based on silicon oxides of the invention, obtained after the second step of the process have a composition of formula $SiO_2$.]

According to particular embodiments, the materials based on silicon oxides of the invention, obtained after the second step of the process, are ordered.

The treatment with microwave radiation coming from solid state sources of the first step of formation of the mesostructured material, is carried out by irradiating for a time that depends on the amount of material to be treated. By way of example, it can be between 30 seconds and 12 minutes, preferably between 30 seconds and 10 minutes, more preferably between 30 seconds and 4 minutes.

The power used for the first step of microwave irradiation coming from solid state sources can be between 20 and 200 W per gram of starting material, preferably between 60 and 100 W/g with a duration of between 30 seconds and 12 minutes, preferably between 30 seconds and 4 minutes, reaching temperatures between 310 K and 360 K, preferably between 330 and 340 K.

The calcination according to the second step eliminates the organic matter, so that it eliminates the alkyltrimethylammonium groups occluded inside the pores.

According to a preferred embodiment, the oxide obtained after the calcination of the second step is UVM-7, made up of aggregates of nanometric mesoporous particles (for example, with a radius of 12-50 nm) welded together that generate a bimodal pore system: typical mesopores generated by the surfactant micelles (structure directing agent) and large mesopores/macropores located in the gaps among the porous nanoparticles.

Microwave radiation treatment coming from solid-state sources of the second step is performed by irradiating for a time that depends on the amount of material to be treated and the mass and absorption capacity of the microwave absorber/susceptor crucible.

The second stage has a duration of microwave irradiation of solid state sources of a time between 3 minutes and 30 minutes, preferably between 3 and 20 minutes, more preferably between 3 and 10 minutes.

The power used in the second step with microwaves from solid state sources is between 100 and 2000 W.

According to preferred embodiments, the power used for the second stage, with microwaves coming from solid state sources, is between 100 and 2000 W for each gram of starting material, preferably between 600 and 1200 W/g with a duration of between 3 minutes and 30 minutes, preferably between 8 minutes and 16 minutes, more preferably between 3 and 10 minutes, reaching temperatures above 770° K and below 1073° K, In the second step, two different powers can be used, even more preferably, so that rapid heating and temperature maintenance are produced.

For example, according to particular embodiments, the powers used are:

between 3 and 9 minutes at a power between 180 and 205 W, preferably 8 min at 200 W and between 3 and 6 minutes at a power of between 145 and 155 W, preferably 5 min at 150 W for 200 mg of material obtained in the first step, and the temperature must not exceed 1073° K.

The frequency used in the process of the invention is between 2400 and 2500 MHz selected so that the absorption in any of the two steps of the synthesis process is maximum. For example, it might be 2450 MHz. A solid-state 2450 MHz source allows you to select frequencies between 2420 and 2480 MHz. Solid-state sources allow a very precise power choice, from 1 W to 1 W, something that magnetrons cannot achieve.

By way of example, a solid-state 2450 MHz source allows frequencies to be selected between 2420 and 2480 MHz. The source used may be a source that produces a maximum power from 200 W at 2450 MHz frequency.

The process of the invention can also comprise a third step of functionalization of the material obtained in the second step. In this third step, organic groups can be added, for example, through the use of silanes, alkyl chains, alkylamino groups, such as propylamine, can be added.

According to additional particular embodiments, the functionalized silicon oxides obtained in the third step have the composition:

$$(SiO_2)_{1-x}((RSiO_{3/2})_x$$

wherein $0<x<0.25$, and R represents an organic group, such as an alkyl chain, which also, optionally, may contain one or more groups selected from amino, thiol, carboxylic acid, alkene, isocyanate, alkyne, azide, among others.

By means of the process of the present invention, silicon oxides are obtained after the second step, or organosilixes (organic silicon compounds or organosilicon compounds are organic compounds that contain covalent bonds between carbon and silicon atoms), optionally, after the third step, compositionally homogeneous and of high phase purity.

The applications of this invention fit into the same sectors that currently use this type of ordered mesoporous materials, but with considerable economic savings derived from the reduction in the time required to obtain them and energy savings. Among these sectors we can find the research, pharmaceutical, food, agricultural sector, etc. It may also be used by companies that currently sell microwave equipment for chemical synthesis based on a magnetron as a radiation source, as an improvement of the equipment by replacing the source with a solid state one.

EMBODIMENT EXAMPLES

Example 1

Silicon Oxide with Bimodal Pore System (UVM-7) Obtained by Microwave Radiation with Solid State Sources.

Tetraethylorthosilicate (21.4 mL, 0.10 mol) and triethanolamine (44.6 mL, 0.34 mol) are mixed under stirring. The resulting mixture is heated at 140° C. for 30 minutes. The obtained homogeneous solution is cooled to 90° C. and cetyltrimethylammonium bromide (9.12 g, 0.03 mol) is added. This solution is stored as stock for the different syntheses. Next, 4.1 mL of the mixture and 10 mL of deionized water are placed in a container, shaken slightly to achieve a single homogeneous phase, and placed inside the microwave cavity. Irradiation with a frequency of 2450 MHz for 2 minutes at 50 W power provides an abundant white precipitate that forms a gel. After the time has elapsed, the vial is immediately placed in an ice bath in order to stop the process. The resulting solid is collected by centrifugation, washed with water and ethanol, and dried in an oven at 40° C. overnight.

Figure 1:
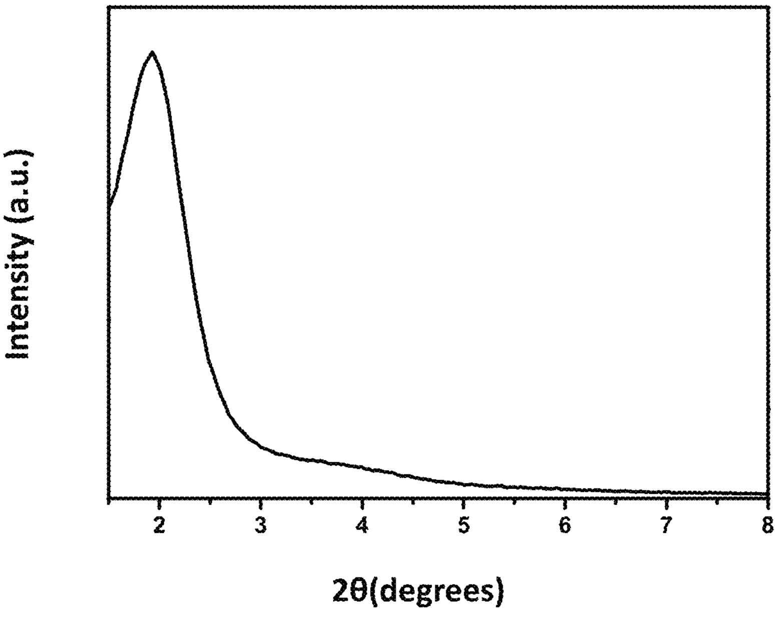
FIG. 1. X-ray diffraction spectrum (CuKα radiation) of UVM-7 mesoporous silicon oxide prepared according to the specific process corresponding to example 1.
Figure 2:
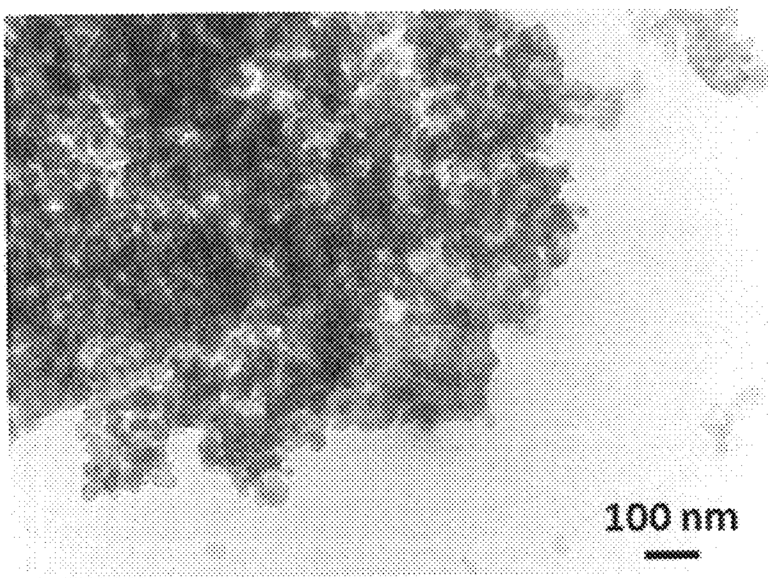
FIG. 2. TEM image of the product of example 1.

Although the material is unfinished, since its pores are covered, in the characterization (FIGS. 1-2) it is verified that it is a mesoporous silicon oxide with a bimodal pore system. The small mesopores are generated by the action of the structural directing agent and are arranged in an organization that can be described as disordered hexagonal. The large mesopores or macropores are generated by welding mesoporous silica particles together. This porous material presents in its diagram of X-ray diffraction at low angles, a high intensity peak at 2θ=1.93° together with a broad signal of lower intensity (FIG. 1). This set of diffraction peaks is characteristic of mesoporous solids with disordered hexagonal symmetry. The TEM images (FIG. 2) clearly show the morphology of the particles and the organization of the two pore systems. Mostly spherical mesoporous particles with average sizes between 20 and 40 nm are observed. Inside each particle, small mesopores with an ordered relative distribution (according to X-ray diffraction data) are detected. The welded particles generate the large pore system.

Example 2

Calcination by Microwave Radiation with Solid State Sources of Silicon Oxide with Bimodal Pore System (UVM-7)

Figure 3:
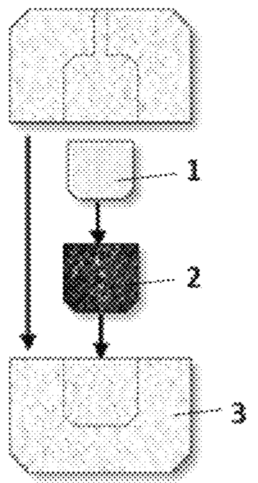

Removal of the templating agent (cetyltrimethylammonium bromide) and all organic impurities adsorbed on the surface of the solid is carried out by calcination. The dry mesostructured solid, obtained in Example 1, is placed in a microwave oven connected to a solid state source. The solid to be calcined is placed on a porcelain crucible and is in turn introduced into another external crucible made of material with the capacity to absorb microwaves, transforming the energy into heat and rapidly raising the temperature of the solid (FIG. 3). Next, it is introduced into the microwave cavity and irradiated with a frequency of 2450 MHz for 8 minutes at 200 W of power and another 5 minutes at 150 W, the crucible reaching a temperature of 850° K that calcines the mesoporous solid. The solid is slowly cooled into the microwave oven to room temperature. In this way, it is possible to open the pore system.

The main characteristics of the material obtained coincide with those of the material before being calcined. It continues to present a bimodal pore system formed by small mesopores, generated by the action of the structural directing agent and arranged in a disordered hexagonal structure, and macropores, obtained by merging the particles. The disordered hexagonal structure is maintained, as indicated by its X-ray diffraction pattern at low angles (FIG. 4). It shows a high intensity peak at 2θ=2.610 together with a broad signal of lower intensity. The TEM images (FIG. 5) clearly show the morphology and organization of the particles in the two pore systems. Mostly spherical mesoporous particles with average sizes between 20 and 40 nm are observed. Inside each particle, small mesopores are detected with an ordered relative distribution (according to the data from X-ray diffraction). The welded particles generate the large pore system. The surface area is 949 $m^2/g$ (FIG. 6), the average mesopore diameter is 2.6 nm, and the largest pore system presents a size distribution according to the BJH model of 47.7 nm (which extends between 20 and 90 nm).

Example 3

Full Synthesis of UVM-7 Mesoporous Silica Material by Using Solid-State Microwave Technology The solid-state microwave radiation device used during the total synthesis process consists of a solid-state microwave source, connected via a coaxial cable to the irradiation cavity (FIG. 7). The radiation source operates at a maximum power of 200 W and the power can be selected in 1 watt increments. The frequency can be selected from 2420 MHz to 2480 MHz in 5 Hz increments to tune the system and optimize absorbed power.

In the synthesis process, 4.12 mL of a mixture of atranes containing Si:$TEAH_3$:CTABr in a molar ratio of 1:3.4:0.25 (TEOS, $TEAH_3$, and CTABr) were transferred to a glass vial and 10 ml of deionized water were added. The mixture was gently shaken until homogeneous and the vial was placed in the cavity of the microwave oven. After irradiating for 2 minutes at 50 W, an abundant white solid resulted which formed a gel. The white solid was cooled in an ice bath. Then, it was collected by centrifugation, washed with water and ethanol and dried in an oven at 40° C. overnight, obtaining the "as made" bimodal mesostructured material.

The CTABr template was removed from UVM-7 by calcination in the solid-state microwave device (FIG. 8). Calcination was achieved by placing 200 mg of UVM-7 "as made" in the calcination chamber located in the cavity of the microwave oven. The calcination conditions consisted of a two-step heating ramp of 8 min at 200 W and 5 min later at 150 W, obtaining a white solid. The frequency was adapted during the calcination process to maximize absorption by the sample.

During the calcination stage, a special calcination chamber was used (FIG. 3). It consists of three distinct parts: an external porous insulating alumina chamber, an intermediate SiC microwave absorber crucible and an internal porcelain crucible.

Calcined UVM-7 was surface modified by microwave irradiation. 50 mg of calcined UVM-7 was dispersed in acetonitrile (15 mL) and mixed with 0.3 mmol of aminopropyltriethoxysilane (APTES) in a glass vial. The mixture was stirred for 10 seconds, placed in the cavity of the microwave oven, and irradiated at 20 W. Subsequently, the mixture was cooled in an ice bath. The white solid was collected by centrifugation, washed with acetonitrile and dried in a 40° C. oven overnight. FIG. 9 shows a diagram of the parts involved in the microwave device used in the example. The microwave source used is a solid state generator system with a maximum output power of 200 W. This generator is connected to a computer equipped with source control software and a coaxial cable that transmits the waves from the generator to the cavity through an antenna.

The invention claimed is:

1. A method for obtaining bimodal mesoporous materials, the method comprising the steps of:

forming a first stage of a mesostructured material containing organic matter, based on silicon oxides obtained from atrane precursors, and forming a second stage of the mesostructured material by eliminating the organic matter contained in the mesostructured material by calcination, wherein:

eliminating the organic matter obtains a bimodal mesoporous material based on silicon oxide, and wherein the second forming step comprises a treatment with microwave radiation coming from solid-state sources at two different powers following a pattern of time and power as follows:

between 3 and 9 minutes at a first power between 180 and 205 W, and between 3 and 6 minutes at a second power of between 145 and 155 W, for 200 mg of material obtained in the first forming step.

2. The method according to claim 1, wherein the first forming step further comprises the steps of:

contacting an atrane with water in the presence of an alkyltrimethylammonium salt, in which an alkyl group is between 8 and 18 carbon atoms, to form a mixture, and subjecting the mixture to microwave radiation coming from the solid-state sources.

3. The method according to claim 1, wherein the two forming steps are carried out by irradiating the starting material for the corresponding step with microwave radiation coming from the solid state sources.

4. The method according to claim 1, wherein the mesostructured material obtained in the first forming step is formed by a porous solid with the formula $SiO_2$ with an alkyltrimethylammonium cation inside the pores, in which an alkyl group is between 8 and 18 carbon atoms.

5. The method according to claim 1, wherein the first forming step comprises a treatment with microwave radiation from the solid state sources for a time between 30 seconds and 12 minutes.

6. The method according to claim 1, wherein the first forming step comprises a treatment with microwave radiation coming from the solid state sources at a power used between 20 and 200 W per gram of the starting material.

7. The method according to claim 1, wherein the second forming step comprises a treatment with microwave radiation coming from the solid state sources during a time between 3 and 30 minutes reaching a temperature above 770° K and below 1073° K.

8. The method according to claim 1, wherein materials obtained after the second forming step are made up of welded nanometric porous particle aggregates that generate a bimodal pore system: mesopores generated by the removal of a structure directing agent and macropores located between the porous nanoparticles.

9. The method according to claim 1, wherein the silicon oxide obtained in the second forming step is UVM-7.

10. The method according to claim 1, which further comprises at least one functionalization step of the bimodal mesoporous material based on silicon oxide obtained after calcination.

11. The method according to claim 10, wherein the at least one functionalization step adds at least one organic group through use of silanes.

12. The method according to claim 11, wherein the at least one organic group is selected from an alkyl chain containing one or more groups selected from amine, thiol, carboxylic acid, alkene, isocyanate, alkyne or azide.

13. The method according to claim 12, wherein the functionalized silicon oxides obtained have the composition:

$$(SiO_2)_{t-x}((RSiO_{3/2})_x$$

wherein $0<x<0.25$, and R is an alkyl chain containing one or several groups selected from amino, thiol, carboxylic acid, alkene, isocyanate, alkyne or azide.

* * * * *